J. N. WHYTE.
MEANS FOR TIPPING WAGONS AND OTHER VEHICLES.
APPLICATION FILED APR. 15, 1919.
1,402,466.
Patented Jan. 3, 1922.
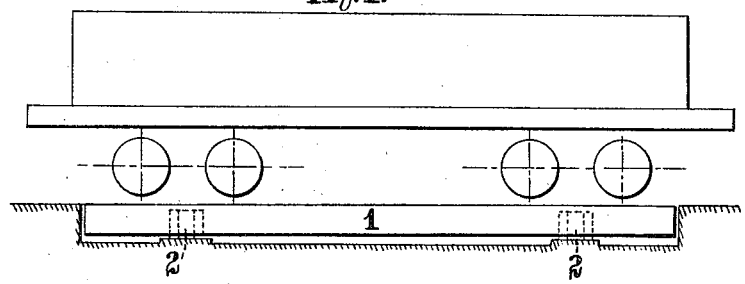
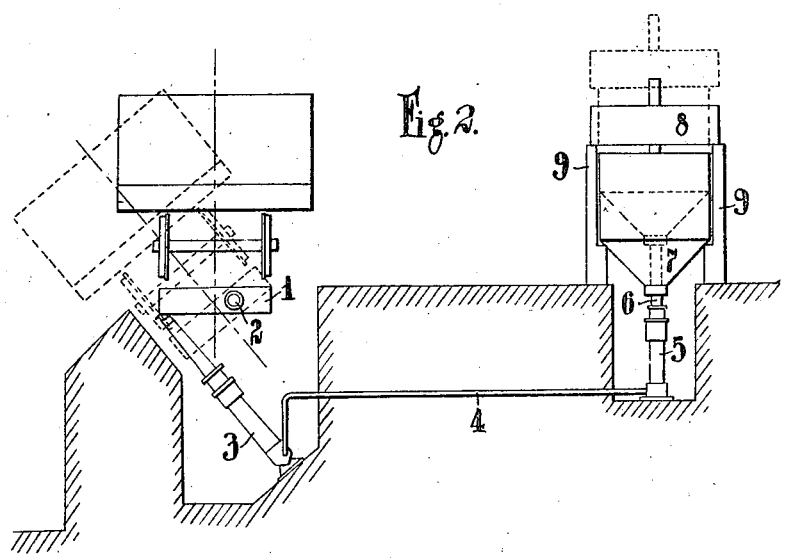
INVENTOR
J. N. Whyte,
By H. R. Kerslake
ATTORNEY

UNITED STATES PATENT OFFICE.

JOHN NICOLAS WHYTE, OF SAN PAULO, BRAZIL.

MEANS FOR TIPPING WAGONS AND OTHER VEHICLES.

1,402,466.                       Specification of Letters Patent.       Patented Jan. 3, 1922.

Application filed April 15, 1919. Serial No. 290,363.

*To all whom it may concern:*

Be it known that I, JOHN NICOLAS WHYTE, of 2 Avenida Rangel Pestaña, San Paulo, Brazil, a subject of the King of Great Britain, have invented certain new and useful Improvements in and Relating to Means for Tipping Wagons and other Vehicles, (for which I have filed an application in Brazil, July 16, 1917, and in Great Britain, May 27, 1918,) of which the following is a specification.

This invention relates to devices for discharging railway wagons and the like of the kind in which the wagon is supported on a track which is tilted in order to cause the contents of the wagon to be discharged.

In certain devices of this kind, the track is supported on suitable bearings in some cases eccentrically disposed, and mechanical means as, for instance, a hydraulic motor to which water under pressure is supplied from a suitable mechanically operated pump, is employed for tilting the track to the desired degree, the truck being subsequently righted by gravity or by the combined effect of gravity and power suitably applied.

It has also been proposed to arrange the track on eccentric bearings, that is to say bearings displaced from the central vertical plane of the track, so that by removing suitable stops the loaded wagon will cause the track to move about the axis of the bearings under the action of gravity to effect the discharge of the contents of the wagon and at the same time to raise a counterweight designed to cause the track to be righted after the contents of the wagon have been discharged.

As will be understood the relation between the center of gravity of the system and the axis of rotation of the track will change during the operation of the device in consequence of the motion of the track and the wagon supported thereon, and in consequence of the contents of the track being discharged, such being the case, if a simple counterweight is employed, and this counterweight is relied upon to cause the return of the track into the horizontal position, the weight must be sufficient to counterbalance the weight of the wagon and track when the center of gravity is at its greatest distance from the axis of the bearings, and consequently in this construction a brake was employed with a view to compensating for the effects of the change in magnitude of the turning moment.

A wagon discharging device according to the present invention comprises a track supported in eccentric bearings, means (brought into operation by the motion of the track under the action of gravity to discharge the contents of the wagon), whereby the track is righted after the contents have been discharged and means adapted automatically to vary the righting effort in accordance with the variation in the magnitude of the turning moment.

Thus, in accordance with the invention, the motion of the track to discharge the contents of the wagon brings into operation a counter effort of gradually increasing magnitude until the track is in its most steeply inclined position and the righting motion of the track causes the counter effort to be correspondingly decreased. The motion of the track to discharge the contents of the wagon may, in accordance with the invention, be utilized to operate upon a hydraulic ram which is connected with an accumulator or pump, the motion of the ram of the accumulator causes the accumulator to operate against a gradually increasing load as by raising a plurality of weights in succession, during the motion of the track to discharge the contents of the wagon and a gradually diminishing load, as by causing the weights to be successively removed from the accumulator head, during the righting operation.

Alternatively the track may be arranged to raise in succession a plurality of counterweights during the motion of the track to discharge the contents of the track and to deposit these weights in succession during the righting motion of the track by connecting the track through the intermediary of flexible members such as ropes or chains with means adapted to pick up and deposit such weights.

Certain constructions in accordance with the invention are illustrated, by way of example, in the accompanying drawings, in which:—

Figure 1 is a vertical section taken longitudinally of the tiltable track section.

Figure 2 is a vertical section taken transversely of the tiltable track section.

Referring to Figures 1 and 2 of the drawings, 1 is the pivoted track support, 2 the bearings therefor, 3 the hydraulic ram, 4 the pipe connecting the same with the accumulator cylinder 5, 6 is the ram in the accumulator cylinder, 7 is a weight bearing upon the head of the accumulator ram, 8 is a second weight arranged to be supported on the structure 9 when the track support is in the righted position and to be picked up by the head of accumulator ram after the track support has begun to tilt, being again deposited on the structure 9, prior to when the track support has reverted to its horizontal position.

Having now particularly described and ascertained the nature of my said invention and in what manner the same is to be performed, I declare that what I claim is:—

1. An apparatus for unloading railway cars comprising a tiltable track section pivotally mounted on an axis eccentric with respect to the longitudinal axis of the track section, hydraulic means normally tending to maintain the tiltable track section in a normal horizontal position and adapted to be counteracted by the load of the car and its contents supported upon the tiltable track section whereby the latter is caused to tilt laterally to effect the removal of the contents, said means operating subsequent to the discharge of the contents of the car to restore the tiltable track section to initial position, and means associated with the first mentioned means and coacting therewith to increase the resistance to the tilting movement of the track section as the latter approaches to initial position, the last mentioned means further assisting in restoring the tiltable track section to initial position for a portion of the return movement of said track section.

2. An apparatus for unloading railway cars comprising a tiltable track section having a pivoted axis disposed eccentrically with respect to its longitudinal axis, a hydraulic ram connected with the pivoted track section, a fluid pump connected with the ram, means coacting with the pump to maintain fluid pressure in the pump to maintain the pivoted track section in normal horizontal position and adapted to be counteracted by the weight of a car and its contents disposed upon the pivoted track section whereby the latter is tilted laterally to effect the discharge of the contents of the car, and means coacting with the first mentioned means to increase the fluid pressure as the pivoted track section approaches the limit of its tilting movement, and coacting with the first mentioned means to return the tiltable platform and car to initial position subsequent to the discharge of the contents of the latter, the last mentioned means operating only during a portion of the return movement of the platform and car.

In testimony whereof I affix my signature.

JOHN NICOLAS WHYTE.